United States Patent
Chen et al.

(10) Patent No.: US 10,594,365 B1
(45) Date of Patent: Mar. 17, 2020

(54) SERVER DEVICE AND POWER MANAGEMENT METHOD

(71) Applicant: Wiwynn Corporation, New Taipei (TW)

(72) Inventors: Yi-Hao Chen, New Taipei (TW); Cheng-Kuang Hsieh, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 16/278,176

(22) Filed: Feb. 18, 2019

(30) Foreign Application Priority Data

Nov. 16, 2018 (TW) .............................. 107140911 A (51) Int. Cl.
*H04B 3/54* (2006.01)
*H04B 1/40* (2015.01)

(52) U.S. Cl.
CPC ............. *H04B 3/54* (2013.01); *H04B 1/40* (2013.01)

(58) Field of Classification Search
CPC ..................................... H04B 3/54; H04B 1/40
See application file for complete search history.

(56) References Cited

U.S. PATENT DOCUMENTS

| 8,051,309 B2 | 11/2011 | Kashi et al. |
| 9,997,958 B2 | 6/2018 | Draaijer et al. |
| 2004/0066283 A1* | 4/2004 | Manis ................ H04B 3/542 370/204 |
| 2013/0121427 A1* | 5/2013 | Sun ..................... H04B 3/56 375/257 |
| 2016/0285309 A1 | 9/2016 | Draaijer et al. |

FOREIGN PATENT DOCUMENTS

| CN | 105052007 | 11/2015 |
| WO | 03005599 | 1/2003 |
| WO | 2013056520 | 4/2013 |

OTHER PUBLICATIONS

"Office Action of Taiwan Counterpart Application," dated Dec. 16, 2019, p. 1-p. 15.

\* cited by examiner

*Primary Examiner* — Kabir A Timory
(74) *Attorney, Agent, or Firm* — JCIPRNET (57) ABSTRACT

A server device and a power management method for the server device are provided. The server device includes a power supply device, a power transmission path, and at least one electronic device. The power supply device includes a first power line communication (PLC) transceiver. The at least one electronic device is coupled to the power transmission path to obtain power from the power supply device. The at least one electronic device includes a second PLC transceiver. The at least one electronic device utilizes the second PLC transceiver to communicate with the first PLC transceiver in the power supply device through the power transmission path to obtain an operation status of the power supply device and control the power supply device.

10 Claims, 8 Drawing Sheets

SERVER DEVICE AND POWER MANAGEMENT METHOD

CROSS-REFERENCE TO RELATED APPLICATION

This application claims the priority benefit of Taiwan application serial no. 107140911, filed on Nov. 16, 2018. The entirety of the above-mentioned patent application is hereby incorporated by reference herein and made a part of this specification.

BACKGROUND

Technical Field

The disclosure relates to a management technology of a server device. More particularly, the disclosure relates to a server device and a power management method for the server device.

Description of Related Art

At present, when a server device works, monitoring and management of the power supply system is required to be maintained in order to ensure continuous operation of the system and normal operation of the power supply system and prevent any damage caused by power abnormality from occurring. In the existing technology, the power supplies and the management device of the server device can only communicate with each other by utilizing network lines through an interposer board in the power supply device.

Nevertheless, when the interposer board is required to be maintained, repaired, or replaced, all external communication performed by the power supplies is required to be shut down. Further, in the current fail-safe design of power, most of the efforts are put into preventing failure of the power supplies. As such, large capacitance or large batteries are used as backup power to quickly re-supply power after power is lost, and thus, less emphasis is put on enforcement of the power management signals.

SUMMARY

The disclosure provides a server device and a management method for the server device capable of performing power management to the server device without an interposer board.

A server device provided by an embodiment of the disclosure includes a power supply device, a power transmission path, and at least one electronic device. The power supply device includes a first power line communication (PLC) transceiver. The power transmission path is coupled to the power supply device. The at least one electronic device is coupled to the power transmission path to obtain power from the power supply device. The at least one electronic device includes a second PLC transceiver. The at least one electronic device utilizes the second PLC transceiver to communicate with the first PLC transceiver in the power supply device through the power transmission path to obtain an operation status of the power supply device and control the power supply device.

A power management method provided by an embodiment of the disclosure is suited to a server device. The server device includes a power supply device, a power transmission path, and at least one electronic device. The power management method includes the following steps. The at least one electronic device is enabled to be coupled to the power transmission path to obtain power from the power supply device. The at least one electronic device is enabled to obtain an operation status of the power supply device and control the power supply device through the power transmission path and the power supply device.

To sum up, the at least one electronic device of the server device obtains power through the power transmission path, and the at least one electronic device obtains the operation status of the power supply device and then controls the power supply device through the same power transmission path by utilizing the power line communication technology. In this way, the server device is capable of performing power management to the server device without an interposer board.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The disclosure provides a novel power management method and a server device suited for the novel power management method, so as to increase reliability and flexibility of a power management system and reduce deployment costs of a power supply system.

Figure 1:
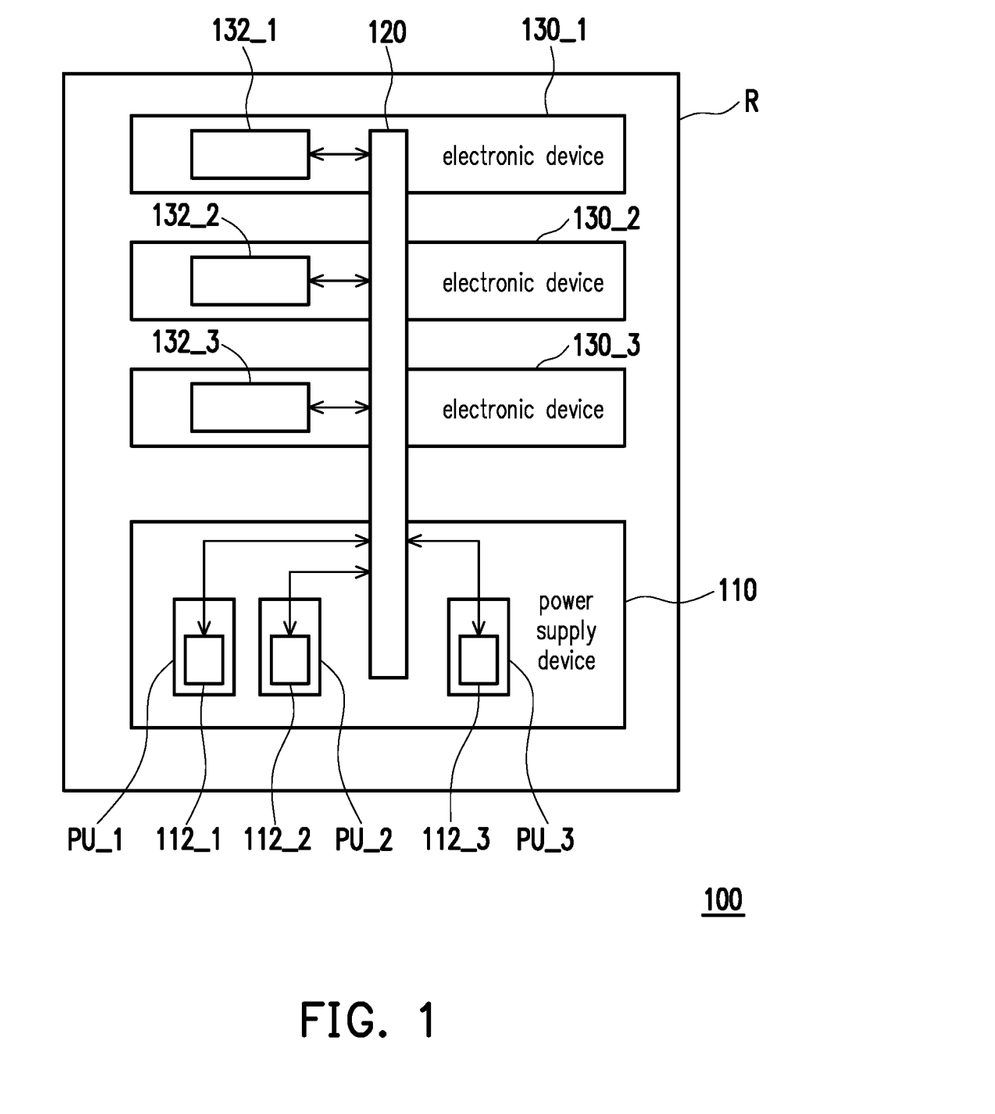
FIG. 1 is a schematic view of a server device according to a first embodiment of the disclosure.

With reference to FIG. 1, FIG. 1 is a schematic view of a server device according to a first embodiment of the disclosure. In this embodiment, a server device 100 includes a power supply device 110, a power transmission path 120, and electronic devices 130_1 to 130_3. The power supply device 110, the power transmission path 120, and the electronic devices 130_1 to 130_3 are disposed in a rack R. The power supply device 110 includes power supplies PU_1 to PU_3. The power supply PU_1 includes a first power line communication (PLC) transceiver 112_1. The power supply PU_2 includes a first PLC transceiver 112_2. Similarly, the power supply PU_3 includes a first PLC transceiver 112_3.

The power transmission path 120 is coupled to the power supply device 110. The power transmission path 120 is a busbar made of a copper rod. The electronic devices 130_1 to 130_3 are individually coupled to the power transmission path 120 so as to obtain power provided by the power supply device 110 through the power transmission path 120. Each of the electronic devices 130_1 to 130_3 may be a server or a storage device. The electronic device 130_1 includes a second PLC transceiver 132_1. The electronic device 130_1 utilizes the second PLC transceiver 132_1 to communicate with one of the first PLC transceivers 112_1 to 112_3 in the power supply device 110 through the power transmission path 120, so as to obtain an operation status of the power supply device 110 and control the power supply device 110. Therefore, the power supplies PU_1 to PU_3 of the power supply device 110 can directly communicate with the electronic devices 130_1 to 130_3 and are controlled by the electronic devices 130_1 to 130_3. In the disclosure, the number of the electronic devices and the number of the power supplies may both be one or more than one, which are not limited by this embodiment.

Figure 2:
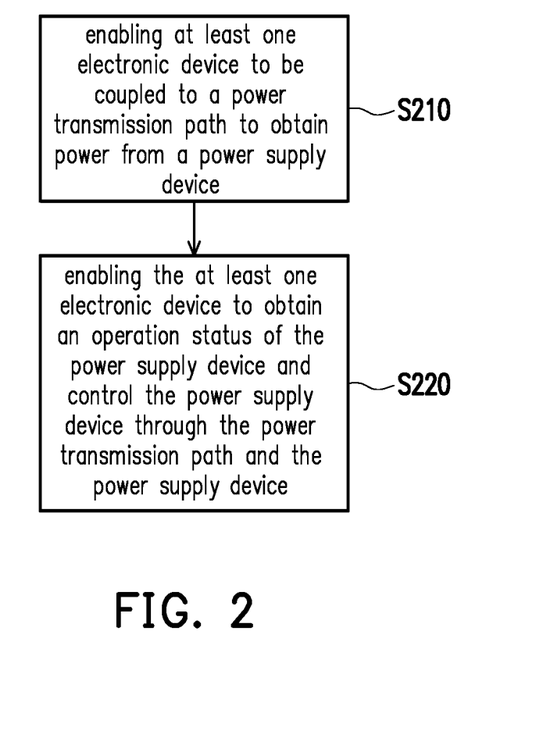
FIG. 2 is a flow chart illustrating a power management method according to the first embodiment.

With reference to FIG. 1 and FIG. 2 together, FIG. 2 is a flow chart illustrating a power management method according to the first embodiment. In step S210, the server device 100 enables the electronic devices 130_1 to 130_3 to be coupled to the power transmission path 120 to obtain power from the power supply device 110. The server device 100 enables the electronic devices 130_1 to 130_3 to obtain the operation status of the power supply device 110 and control the power supply device 110 through the power transmission path 120 and the power supply device 110 in step S220.

For instance, the server device 100 enables the electronic device 130_1 to obtain power provided by the power supply device 110 through the power transmission path 120 in step S210. In step S220, the electronic device 130_1 utilizes the second PLC transceiver 132_1 to communicate with the first PLC transceiver 112_1 of the power supply PU_1 in the power supply device 110 through the power transmission path 120, so as to obtain the operation status of the power supply PU_1 and further control or change the operation status of the power supply PU_1. Similarly, in step S220, the electronic device 130_1 may also utilize the second PLC transceiver 132_1 to communicate with the first PLC transceiver 112_2 of the power supply PU_2 through the power transmission path 120, so as to obtain the operation status of the power supply PU_2 and further control or change the operation status of the power supply PU_2. In the same way, the electronic device 130_1 may also utilize the second PLC transceiver 132_1 to communicate with the first PLC transceiver 112_3 of the power supply PU_3 through the power transmission path 120 in step S220, so as to obtain the operation status of the power supply PU_3 and further control or change the operation status of the power supply PU_3.

Likewise, the electronic devices 130_2 and 130_3 may respectively utilize the second PLC transceivers 132_2 and 132_3 to communicate with the first PLC transceivers 112_1 to 112_3 of the power supplies PU_1 to PU_3 through the power transmission path 120, so as to obtain the operation statuses of the power supplies PU_1 to PU_3 and further control or change the operation statuses of the power supplies PU_1 to PU_3.

In the disclosure, the power line communication (PLC) technology is utilized to obtain power provided by the power supply device 110 through the power transmission path 120 and obtain the operation status of the power supply device 110. In this way, an interposer board can be omitted and moreover, when at least one of the power supplies PU_1 to PU_3 in the power supply system is under maintenance, is repaired, or is replaced, operation of other power supplies is not to be affected. Hence, extra costs of physical circuits between the interposer board and the electronic devices 130_1 to 130_3 are saved, and costs of physical circuits used in top of rack (TOR) or end of row (EOR) deployment are reduced as well in the disclosure. Therefore, time for circuit layout and mounting of a server system 100 may be further reduced in the disclosure.

Further, in this embodiment, the server device 100 is further configured to set a plurality of carrier frequencies. The server device 100 may set carrier frequencies of, for example, 120 kHz, 200 kHz, 220 kHz, 240 kHz, etc., but the disclosure is not limited thereto. In this way, the first PLC transceivers 112_1 to 112_3 may modulate a status signal provided by the power supply device 110 to a modulated status signal according to the multiple carrier frequencies and provide the modulated status signal to the power transmission path 120. Taking the first PLC transceiver 112_1 of the power supply PU_1 for example, the first PLC transceiver 112_1 selects one of the carrier frequencies (e.g., the carrier frequency of 120 kHz) and modulates the status signal (i.e., the status signal corresponding to the operation status of the power supply PU_1) provided by the power supply device 110 to a modulated status signal. The second PLC transceivers 132_1 to 132_3 may receive the modulated status signal through the power transmission path 120 and demodulate the modulated status signal to the status signal according to the carrier frequencies. Taking the second PLC transceiver 132_1 of the electronic device 130_1 for example, the second PLC transceiver 132_1 receives the modulated status signal and demodulates the modulated status signal to the status signal according to the carrier frequency of 120 kHz. The electronic device 130_1 may obtain the operation status of the power supply device 100 through the status signal. That is, the electronic device 130_1 obtains the operation status of the power supply PU_1 through the status signal.

As described above, after obtaining the operation status of the power supply device 100, the electronic device 130_1 provides a control signal configured to control the power supply device 110 (e.g., control the power supply PU_1). The second PLC transceiver 132_1 may also select one of the carrier frequencies (e.g., the carrier frequency of 220 kHz), modulates the control signal to a modulated control signal, and provides the modulated control signal to the power transmission path 120. The first PLC transceiver 112_1 receives the modulated control signal through the power transmission path 120 and demodulates the modulated control signal to the control signal according to the carrier frequency of 220 kHz. The power supply PU_1 can change the operation status according to the control signal provided by the electronic device 130_1.

In this embodiment, each of the first PLC transceivers 112_1 to 112_3 and each of the second PLC transceivers 132_1 to 132_3 may include a modulator and a demodulator capable of supporting the amplitude-shift keying (ASK), the frequency-shift keying (FSK), or the orthogonal frequency-division multiplexing (OFDM) technology.

Figure 3:
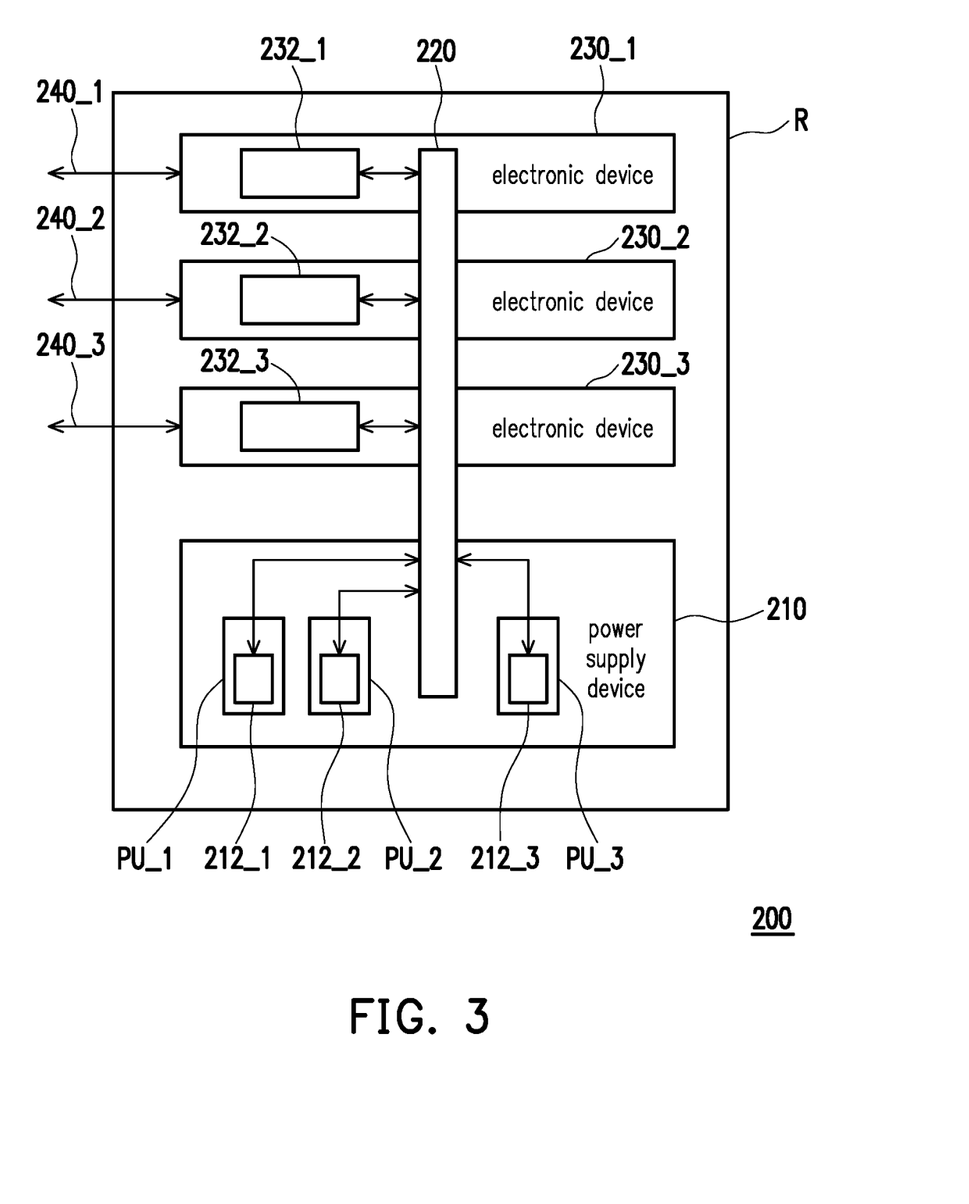
FIG. 3 is a schematic view of a server device according to a second embodiment of the disclosure.

With reference to FIG. 3, FIG. 3 is a schematic view of a server device according to a second embodiment of the disclosure. In the second embodiment, a server device 200 includes a power supply device 210, a power transmission path 220, and electronic devices 230_1 to 230_3. The power supply device 210, the power transmission path 220, and the electronic devices 230_1 to 230_3 are disposed in a rack R.

In this embodiment, the electronic devices 230_1 to 230_3 and the power supply device 210 may utilize a communication signal having a first carrier frequency among a plurality of signals to perform communication through the power transmission path 220. Further, the power transmission path 220 may be a signal bus supporting, for example, a serial peripheral interface (SPI), an inter-integrated circuit (I²C) interface, a universal asynchronous receiver/transmitter (UART) interface or a RS-232 interface. The server device 200 may determine whether a hang occurs in an electrical potential of the communication signal on the power transmission path 220. The hang occurs due to abnormal operation on at least one of the electronic devices 230_1 to 230_3, so that a signal level on the power transmission path 220 is maintained at the same voltage level. Taking the power transmission path 220 supporting the I²C interface for example, when a hang occurs in the communication signal on the power transmission path 220, the signal level on the power transmission path 220 is maintained at a low voltage level. When the server device 200 determines that a hang occurs in the electrical potential of the communication signal on the power transmission path 220, the server device 200 broadcast a confirmation signal having a second carrier frequency to the electronic devices 230_1 to 230_3 and communicates with the electronic devices 230_1 to 230_3 through the confirmation signal, so as to confirm the abnormal electronic device among the electronic devices 230_1 to 230_3.

In this embodiment, the confirmation signal and the communication signal have different carrier frequencies. That is, the first carrier frequency is different from the second carrier frequency.

Figure 4:
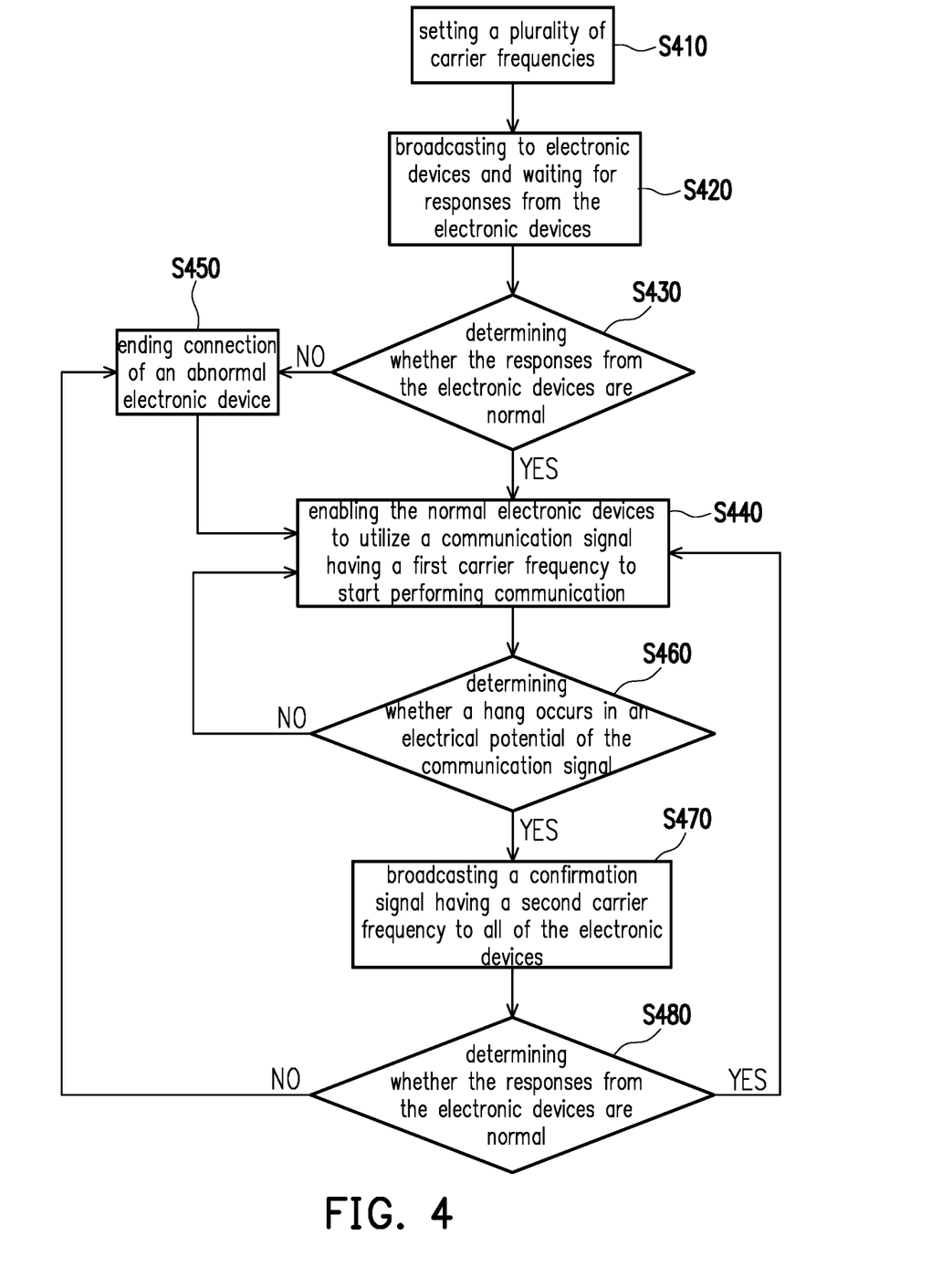
FIG. 4 is a flow chart illustrating a power management method according to the second embodiment of the disclosure.

Furthermore, with reference to FIG. 3 and FIG. 4 together, FIG. 4 is a flow chart illustrating a power management method according to the second embodiment of the disclosure. In step S410, the server device 200 sets carrier frequencies of, for example, 120 kHz, 200 kHz, 220 kHz, 240 kHz, etc., but the disclosure is not limited thereto. In step S420, the server device 200 broadcasts to the electronic devices 230_1 to 230_3 through the power transmission path 220 and waits for responses from the electronic devices 230_1 to 230_3. As regards a broadcast manner, the server device 200 may utilize one of the electronic devices 230_1 to 230_3 (e.g., the electronic device 230_1) to broadcast to the other electronic devices 230_1 to 230_3 (e.g., the electronic devices 230_2 and 230_3). The server device 200 may first utilize the electronic device 230_1 to broadcast to the electronic devices 230_2 and 230_3, utilizes the electronic device 230_2 to broadcast to the electronic devices 230_1 and 230_3 next, and the utilizes the electronic device 230_3 to broadcast to the electronic devices 230_1 and 230_2. The server device 200 may also utilize an external electronic device or a host to broadcast to the electronic devices 230_1 to 230_3.

In step S430, the server device 200 determines whether the responses from the electronic devices 230_1 to 230_3 are normal through the power transmission path 220. In step S430, if the server device 200 determines that all of the responses of the electronic devices 230_1 to 230_3 are normal, step S440 is then performed. For instance, the server device 200 may provide a response time limit (e.g., 1 millisecond). After broadcasting to the electronic devices 230_1 to 230_3, if the server device 200 receives the responses from the electronic devices 230_1 to 230_3 within the response time limit, it means that the electronic devices 230_1 to 230_3 are all normal electronic devices, and step S440 is then performed. The server device 200 enables the normal electronic devices to utilize the communication signal having the first carrier frequency to start performing communication in step S440.

Nevertheless, if the server device 200 determines that at least one of the responses from at least one of the electronic devices 230_1 to 230_3 is abnormal through the power transmission path 220 in step S430, step S450 is then performed. For instance, after broadcasting to the electronic devices 230_1 to 230_3, if the server device 200 does not receive the response from the electronic device 230_1 within the response time limit, it means that the electronic device 230_1 is an abnormal electronic device and the electronic devices 230_2 and 230_3 are normal electronic devices, and step S450 is thus performed. The server device 200 ends the connection of the abnormal electronic device in step S450. As described above, when the electronic device 230_1 is determined to be an abnormal electronic device, the server device 200 may utilize the electronic devices 230_2 and 230_3 to control the power supply device 210 through the power transmission path 220 by using a power line transmission manner, so that the power supply device 210 turns off power of the electronic device 230_1 to end the connection of the electronic device 230_1. Step S440 is performed after step S450 is completed, and the server device 200 enables the normal electronic devices to utilize the communication signal having the first carrier frequency to start performing communication.

When the normal electronic devices utilize the communication signal having the first carrier frequency to perform communication, the server device 200 determines whether a hang occurs in the electrical potential of the communication signal in step S460. In this embodiment, the server device 200 may determine whether a hang occurs in the electrical potential of the communication signal through the power transmission path 220 and the normal electronic devices. The server device 200 may also utilize an external electronic device or a host to determine whether a hang occurs in the electrical potential of the communication signal. If the server device 200 determines that a hang does not occur in the electrical potential of the communication signal, step S440 is performed again. Conversely, if the server device 200 determines that a hang occurs in the electrical potential of the communication signal in step S460, such situation may cause the normal electronic devices to be unable to communicate with one another or to be unable to perform external communication. Step S470 is then performed, and the server device 200 broadcasts the confirmation signal having the second carrier frequency to all of the electronic devices through the power transmission path 220. The server device 200 may also utilize an external electronic device or a host to broadcast the confirmation signal having the second carrier frequency.

In step S480, the server device 200 may determine whether the responses from the electronic devices 230_1 to 230_3 are normal through the power transmission path 220 and the confirmation signal having the second carrier frequency. If the server device 200 determines that the responses from the electronic devices 230_1 to 230_3 are normal, it means that the communication signal is recovered. Therefore, step S440 is performed again, and the server device 200 enables the normal electronic devices (or the recovered electronic device) to utilize the communication signal having the first carrier frequency to perform communication. Alternatively, if the server device 200 determines that at least one of the responses from at least one of the electronic devices 230_1 to 230_3 is abnormal, the server device 200 ends the connection of the abnormal electronic device(s) in step S450.

Figure 5A:
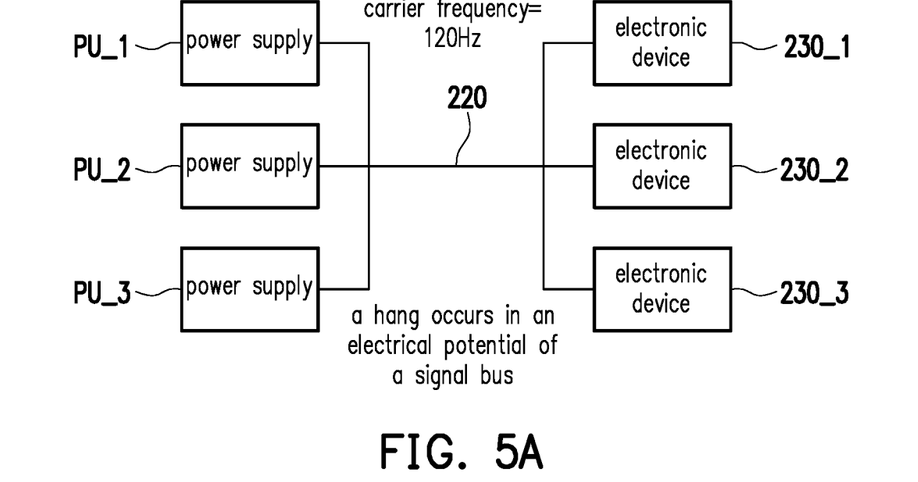
FIG. 5A is a schematic diagram illustrated according to step S460.
Figure 5B:
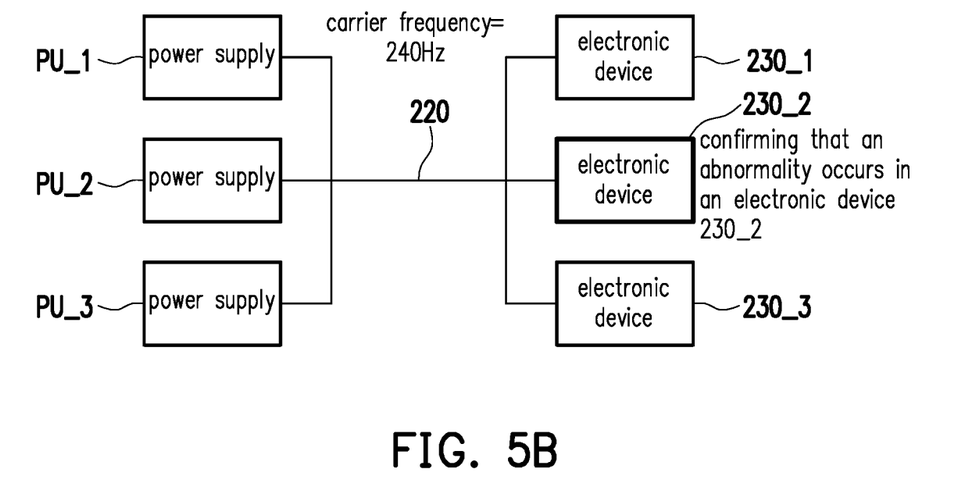
FIG. 5B is a schematic diagram illustrated according to step S470.
Figure 5C:
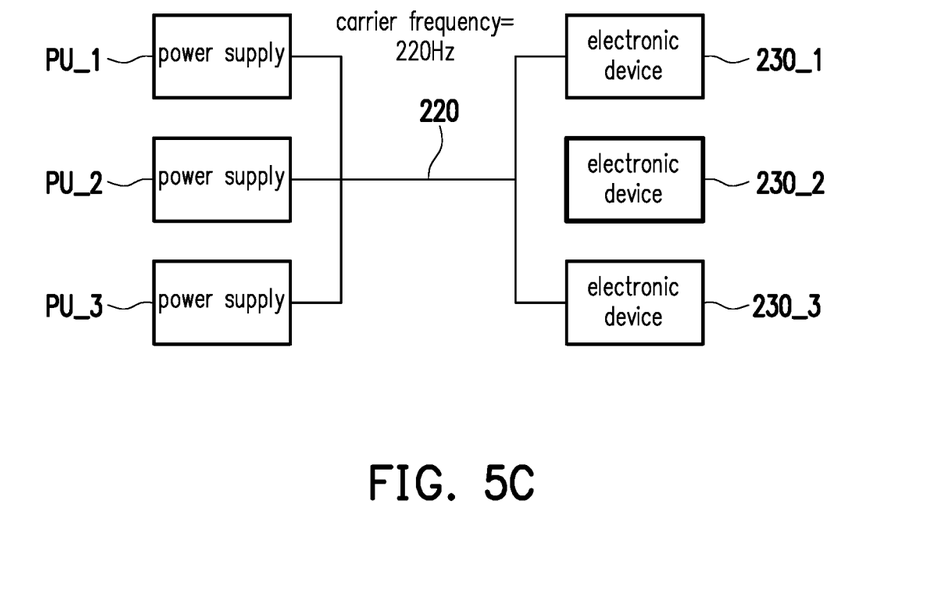
FIG. 5C is a schematic diagram illustrated according to step S450.

How the server device 200 processes a hang occurred in the electrical potential of the communication signal is further described herein. With reference to FIG. 4 and FIG. 5A to FIG. 5C together, FIG. 5A is a schematic diagram illustrated according to step S460. FIG. 5B is a schematic diagram illustrated according to step S470. FIG. 5C is a schematic diagram illustrated according to step S450. In FIG. 5A, the electronic devices 230_1 to 230_3 communicate with the communication signal having the carrier frequency of 120 kHz through the power transmission path 220. It is determined that a hang occurs in the communication signal on the power transmission path 220 in step S460. The server device broadcasts the confirmation signal having the carrier frequency of 240 kHz to the electronic devices 230_1 to 230_3 (as shown in 5B) in step S470. Further, the server device obtains that the electronic device 230_2 is an abnormal electronic device. In FIG. 5C, when the electronic device 230_2 is determined to be an abnormal electronic device, the server device enables the electronic devices 230_1 to 230_3 to utilize the communication signal having a third carrier frequency to perform communication. In this embodiment, since the electronic device 230_2 is an abnormal electronic device, the electronic devices 230_1 and 230_3 provide the communication signal having the carrier frequency of, for example 220 kHz, to at least one of the power supplies PU_1 to PU_3 (e.g., the power supply PU_2) to perform communication through the power transmission path 220. The power supply PU_2 may utilize the communication signal having the carrier frequency of 220 kHz to turn off power of the electronic device 230_2, so as to end the connection of the electronic device 230_2. Therefore, the electrical potential on the power transmission path 220 is released, and signal communication of the electronic devices 230_1 to 230_3 through the power transmission path 220 is returned to normal.

Figure 6:
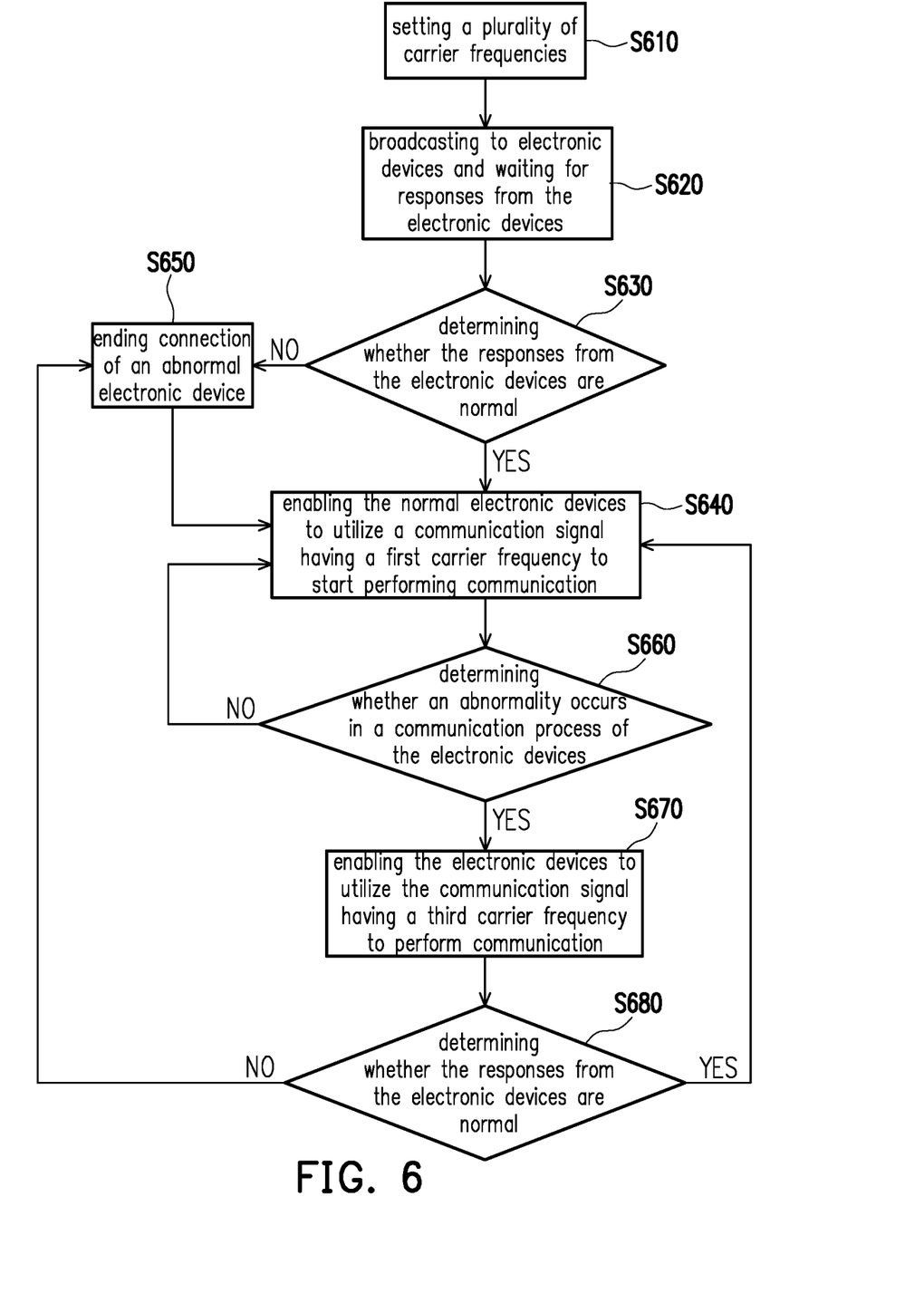
FIG. 6 is a flow chart illustrating another power management method according to the second embodiment of the disclosure.

Another power management method is introduced as follows. With reference to FIG. 3 and FIG. 6 together, FIG. 6 is a flow chart illustrating another power management method according to the second embodiment of the disclosure. First, reference can be made to steps S410 to S450 of FIG. 4 for implementation details of steps S610 to S650 in this embodiment, and related description is thus omitted herein. In this embodiment, the server device 200 also determines whether an abnormality occurs in a communication process of the electronic devices 230_1 to 230_3 in step S660. If it is determined that no abnormality occurs in the electronic devices 230_1 to 230_3, step S640 is performed again. Conversely, if it is determined that an abnormality occurs in at least one of the electronic devices 230_1 to 230_3, it means that at least one of the electronic devices 230_1 to 230_3 is incapable of performing communication through the existing communication signal having the first carrier frequency (e.g., having the carrier frequency of 120 kHz). Hence, the server device 200 enables the electronic devices 230_1 to 230_3 to utilize the communication signal having the third carrier frequency (e.g., having the carrier frequency of 200 kHz) to perform communication in step S670, and step S680 is performed next. Reference can be made to S480 of FIG. 4 for implementation details of S680, and related description is thus omitted herein. It could be understood that the power management method illustrated in FIG. 6 may be applied to the server device 100 of FIG. 1.

Based on the power management methods provided in FIG. 4 and FIG. 6, the server device may determine whether an abnormality occurs in the electronic devices through the power transmission path and the plural signals having different carrier frequencies. Moreover, the abnormality may be eliminated through the power transmission path and the plural signals having different carrier frequencies, so that power management capability of the server device is enhanced to be more robust.

With reference to FIG. 3 again, in this embodiment, a server device 300 further includes at least one communication interface. Taking this embodiment for example, the server device 300 includes communication interfaces 240_1 to 240_3. The communication interface 240_1 is coupled to the electronic device 230_1, the communication interface 240_2 is coupled to the electronic device 230_2, and the communication interface 240_3 is coupled to the electronic device 230_3. When the server device 300 determines that an abnormality occurs in the electronic devices 230_1 to 230_3, the normal electronic device among the electronic devices 230_1-230_3 (e.g., the electronic device 230_1) may provide such abnormal situation to an external device and/or a manager through the corresponding communication interface (e.g., the communication interface 240_1). Upon receiving the abnormal situation through the corresponding communication interface, the external device and/or the manager may provide an instruction related to abnormality elimination to the electronic device through the same communication interface (e.g., the communication interface 240_1). The above instruction may be configured to, for example, instruct the server device 300 to broadcast the confirmation signal having the second carrier frequency (e.g., S470 of FIG. 4) or enable the electronic devices 230_1 to 230_3 to utilize the communication signal having the third carrier frequency to perform communication (e.g., step S670 of FIG. 6). In this way, the external device and/or the manager may obtain the abnormal situation of the server device 300 and provide one of a plurality of instructions to eliminate the abnormal situation of the server device 300.

Figure 7:
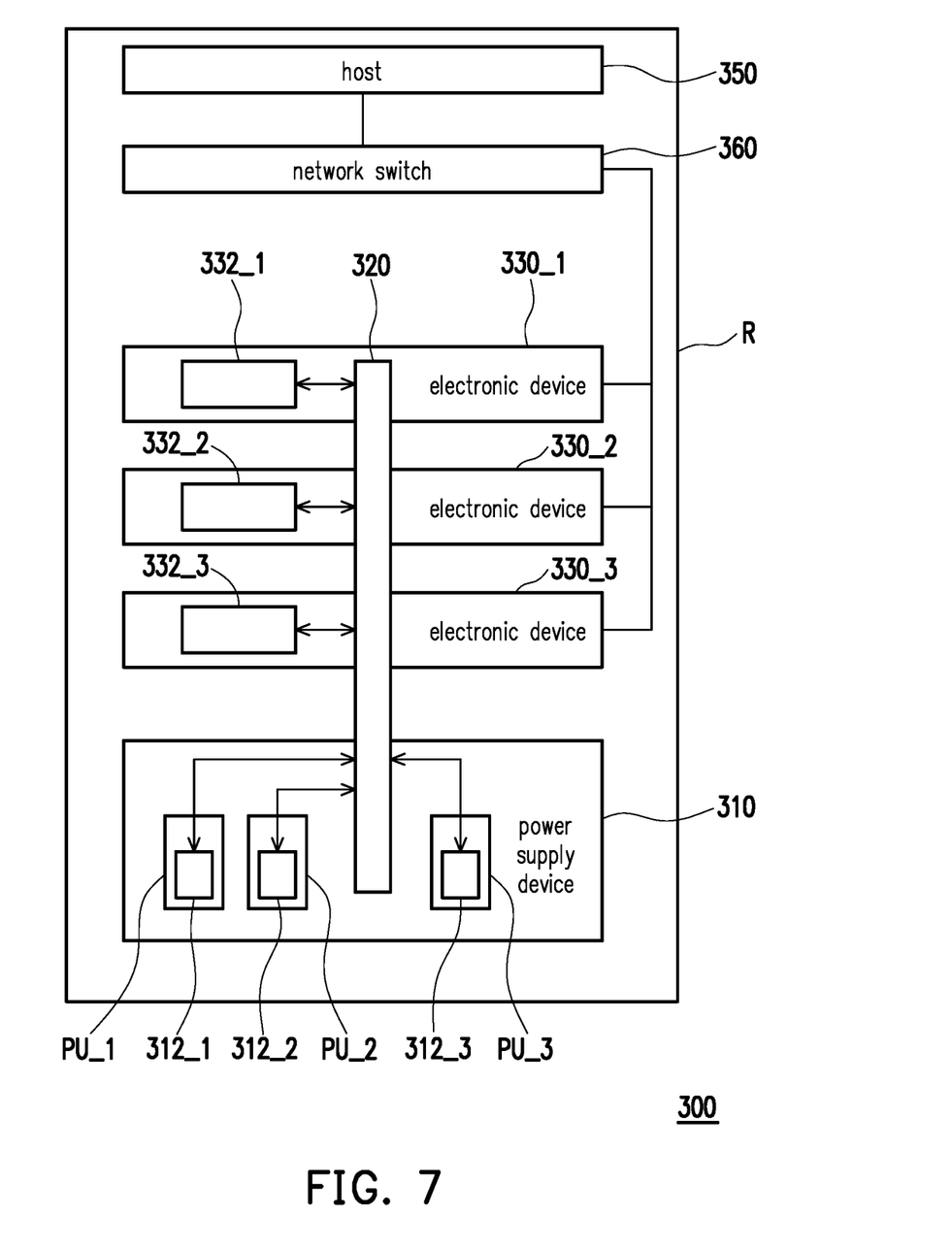
FIG. 7 is a schematic view of a server device according to a third embodiment of the disclosure.

With reference to FIG. 7, FIG. 7 is a schematic view of a server device according to a third embodiment of the disclosure. A server device 300 of FIG. 7 includes a power supply device 310, a power transmission path 320, electronic devices 330_1 to 330_3, a host 350, and a network switch 360. In this embodiment, the power supply device 310, the power transmission path 320, the electronic devices 330_1 to 330_3, the host 350, and the network switch 360 are disposed in a rack R. At least one of the host 350 and the network switch 360 may be disposed outside the rack R according to design needs. In this embodiment, the host 350 may communicate with the electronic devices 330_1 to 330_3 through the network switch 360. The server device 300 may be applied to the power management methods of FIG. 4 and FIG. 6. Therefore, the server device 300 may broadcast to the electronic devices 330_1 to 330_3 via the network switch 360 through the host 350, as shown in step S420 of FIG. 4 or step S460 in FIG. 6. The server device 300 may determine whether an abnormality occurs in the electronic devices 330_1 to 330_3 through the host 350, as shown in steps S460 and S480 of FIG. 4 or steps S660 and S680 of FIG. 6. Further, the server device 300 may also end connection of an abnormal electronic device through the host 350. Sufficient teachings related to implementation details of the power supply device 310, the power transmission path 320, and the electronic devices 330_1 to 330_3 may be obtained through the second embodiment shown in FIG. 3 and the power management methods shown in FIG. 4 to FIG. 6, and related description is thus omitted herein.

In view of the foregoing, the electronic devices of the server device obtain power from the power supply device through the power transmission path, and the at least one electronic device obtains the operation status of the power supply device and then controls the power supply device through the same power transmission path. In this way, the server device is capable of performing power management to the server device without an interposer board. Therefore, extra costs of physical circuits between the interposer board and the electronic devices as well as deployment costs of deploying multiple server devices are saved in this disclosure. In addition, the power management method provided by the disclosure may also enhance robustness of power management capability of the server device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A server device, comprising:
   a power supply device, comprising a first power line communication (PLC) transceiver;
   a power transmission path, coupled to the power supply device; and
   at least one electronic device, coupled to the power transmission path to obtain power from the power supply device, wherein the at least one electronic device comprises a second PLC transceiver,
   wherein the at least one electronic device utilizes the second PLC transceiver to communicate with the first PLC transceiver in the power supply device through the power transmission path to obtain an operation status of the power supply device and control the power supply device,
   wherein the server device is further configured to:
      set a plurality of carrier frequencies in the first PLC transceiver,
      determine whether an abnormality occurs based on a communication signal having a first carrier frequency of the plurality of carrier frequencies and received through the power transmission path by the second PLC transceiver, and
      eliminate the abnormality through the power transmission path,
   wherein said eliminating the abnormality through the power transmission path comprises using the communication signal at a different carrier frequency of the plurality of carrier frequencies than the first carrier frequency.

2. The server device as claimed in claim 1, wherein the power transmission path is a busbar made of a copper rod.

3. The server device as claimed in claim 1, wherein:
   the first PLC transceiver is configured to modulate a status signal provided by the power supply device to a modulated status signal according to the carrier frequencies,
   the second PLC transceiver is configured to demodulate the modulated status signal to the status signal according to the carrier frequencies, and
   the at least one electronic device obtains the operation status of the power supply device through the status signal.

4. The server device as claimed in claim 1, wherein the server device is further configured to:
   enable the at least one electronic device to communicate and the power supply device to utilize the communication signal to perform communication through the power transmission path and determine whether a hang occurs in an electrical potential of the communication signal according to the communication signal,
   broadcast a confirmation signal to the at least one electronic device when determining that a hang occurs in the electrical potential of the communication signal and communicate with the at least one electronic device through the confirmation signal to confirm the abnormal at least one electronic device, wherein the confirmation signal has a second carrier frequency different from the first carrier frequency.

5. The server device as claimed in claim 1, wherein the server device is further configured to:
   enable the at least one electronic device to communicate and the power supply device to utilize the communication signal to perform communication through the power transmission path and determine whether an abnormality occurs in a communication process of the at least one electronic device according to the communication signal,
   enable the at least one electronic device to utilize another communication signal to perform communication when determining that an abnormality occurs in the communication process of the at least one electronic device, wherein the another communication signal has a third carrier frequency.

6. A power management method for a server device, the server device comprising a power supply device, a power transmission path, and at least one electronic device, the power management method comprising:
   enabling the at least one electronic device to be coupled to the power transmission path to obtain power from the power supply device;
   enabling the at least one electronic device to obtain an operation status of the power supply device and control the power supply device through the power transmission path and the power supply device;
   setting a plurality of carrier frequencies;
   determining whether an abnormality occurs in the electronic devices based on a communication signal having a first carrier frequency of the plurality of carrier frequencies and received through the power transmission path; and
   eliminating the abnormality through the power transmission path,
   wherein said eliminating the abnormality through the power transmission path comprises using the communication signal at a different carrier frequency of the plurality of carrier frequencies than the first carrier frequency.

7. The power management method as claimed in claim 6, wherein the power transmission path is a busbar made of a copper rod.

8. The power management method as claimed in claim 6, wherein the step of enabling the at least one electronic device to obtain the operation status of the power supply device and control the power supply device through the power transmission path and the power supply device further comprises:
   modulating a status signal provided by the power supply device to a modulated status signal according to the carrier frequencies;
   demodulating the modulated status signal to the status signal according to the carrier frequencies; and obtaining the operation status of the power supply device through the status signal.

9. The power management method as claimed in claim 6, wherein the step of determining whether the abnormality occurs in the electronic devices based on the communication signal having the first carrier frequency of the carrier frequencies and received through the power transmission path, and eliminating the abnormality through the power transmission path comprises:

enabling the at least one electronic device to communicate and the power supply device to utilize the communication signal to perform communication through the power transmission path;

determining whether a hang occurs in an electrical potential of the communication signal according to the communication signal, wherein the communication signal has a first carrier frequency;

broadcasting a confirmation signal to the at least one electronic device when determining that a hang occurs in the electrical potential of the communication signal and communicating with the at least one electronic device through the confirmation signal to confirm the abnormal at least one electronic device.

10. The power management method as claimed in claim 6, wherein the step of determining whether the abnormality occurs in the electronic devices based on the communication signal having the first carrier frequency of the plurality of carrier frequencies and received through the power transmission path, and eliminating the abnormality through the power transmission path comprises:

enabling the at least one electronic device to communicate and the power supply device to utilize the communication signal to perform communication through the power transmission path;

determining whether an abnormality occurs in a communication process of the at least one electronic device; and     enabling the at least one electronic device to utilize another communication signal to perform communication when determining that an abnormality occurs in the communication process of the at least one electronic device, wherein the another communication signal has a third carrier frequency.

* * * * *